United States Patent
Sato et al.

[11] Patent Number: 5,902,971
[45] Date of Patent: May 11, 1999

[54] MUFFLER FOR INTERNAL COMBUSTION ENGINE

[75] Inventors: Yasuharu Sato, Tokyo; Yukio Sakaguchi, Saitama; Kengo Kubo, Kanagawa, all of Japan

[73] Assignee: Kioritz Corporation, Tokyo, Japan

[21] Appl. No.: 09/015,447

[22] Filed: Jan. 29, 1998

[30]  Foreign Application Priority Data

Jan. 31, 1997 [JP] Japan ................................. 9-018727

[51] Int. Cl.$^6$ ..................................................... F01N 1/14
[52] U.S. Cl. ............................. 181/262; 181/272; 60/299
[58] Field of Search ................................. 181/230, 259, 181/260, 261, 262, 263, 240, 258, 272, 283; 60/289, 290, 293, 298, 299, 302, 310

[56]  References Cited

U.S. PATENT DOCUMENTS

| | | | |
|---|---|---|---|
| 1,635,938 | 7/1927 | Hudson | 60/310 |
| 3,082,597 | 3/1963 | Hamblin | 60/299 |
| 3,116,596 | 1/1964 | Boehme et al. | 60/299 |
| 4,579,194 | 4/1986 | Shiki et al. | 181/262 |
| 5,338,903 | 8/1994 | Winberg . | |
| 5,431,013 | 7/1995 | Yamaki et al. | 181/262 |
| 5,738,184 | 4/1998 | Masuda et al. | 181/262 |

FOREIGN PATENT DOCUMENTS 43930  10/1978  Japan .

*Primary Examiner*—Khanh Dang
*Attorney, Agent, or Firm*—Baker & Botts, L.L.P.

[57]  ABSTRACT

A muffler for a two-stroke internal combustion engine includes an expansion chamber into which exhaust gas ejected from the exhaust port of the engine is introduced. An air-supplying device is adapted to supply outside air to the expansion chamber. The air-supplying device is actuated by taking advantage of the pressure pulsation in the crank case of the engine, and is constituted by a diaphragm pump.

5 Claims, 2 Drawing Sheets

MUFFLER FOR INTERNAL COMBUSTION ENGINE

BACKGROUND OF THE INVENTION

1. Field of the Invention

This invention relates to a muffler for a small air-cooled two-stroke gasoline internal combustion engine which is suited for use in a portable small working machine such as a bush cutter or a chain saw. More particularly, the invention relates to an air-supplying device for a muffler in which an oxidation catalyst is accommodated in order to comply with exhaust gas regulations.

2. The Prior Art

In view of the recent increasing concerns over environmental issues, the reduction in the amounts of HC, CO, NOx, etc. in the exhaust gas discharged from an engine is now strongly required even for a small air-cooled two-stroke gasoline internal engine to be used in a portable small working machine such as a bush cutter or a chain saw. For example, according to the exhaust gas control bill in California known as CARB 1999, it is stipulated that CO should be reduced to 130 g/bhp-h or less, the total HC (THC) to 50 g/bhp-h or less, and NOx to 4 g/bhp-h or less, starting from 1999.

With a view to cope with such an exhaust gas regulation, there have been proposed various measures, such as improving the combustion chamber of internal combustion engines, modifying the shape of the suction/exhaust ports or of the scavenging port of cylinders of internal combustion engines, and providing an exhaust gas system with an exhaust gas-purifying means such as an oxidation catalyst. However, all of these attempts have failed to obtain a satisfactory result to date.

The present assignee of the present invention has already proposed, as a countermeasure to cope with the aforementioned exhaust gas regulation, a system wherein the exhaust gas discharged from the exhaust port of an engine is directly introduced into a muffler disposed in the engine body, and wherein the muffler is provided with an oxidation catalyst in a specific manner for purifying the exhaust gas. Specifically, the measures set forth in the Japanese Patent Application H7-272959 (U.S. patent application Ser. No. 08/733,299), now U.S. Pat. No. 5,722,237, are constituted such that an oxidation catalyst assembly is formed at first by superimposing a web-like oxidation catalyst on a spark arresting metal mesh having a peripheral folding portion to obtain a laminate. The peripheral folding portion of the metal mesh is then turned around the entire or most of the periphery of the laminate, thereby providing a U-shaped or V-shaped oxidation catalyst assembly, which is then disposed within the muffler (Prior Art No. 1). The measures set forth in the Japanese Patent Application H7-343092 are constituted such that an oxidation catalyst comprising an air-permeable metallic foamed body is disposed in an exhaust gas inlet portion of the muffler (Prior Art No. 2).

According to the muffler incorporated therein with an oxidation catalyst as proposed by the Prior Art No. 1 and 2, the structure of the muffler itself, the shape of the oxidation catalyst, and the layout of the catalyst are not yet optimized to sufficiently enhance the exhaust gas purifying property of the catalyst. Further, measures for improving the mounting property, assembling property and design freedom of the muffler in relation to the engine are not taken into account. Moreover, special consideration is not given to the problem resulting from the increase in temperature of the exhaust gas due to the reaction thereof with the oxidation catalyst (oxidative combustion).

Under the circumstances, the present applicant has proposed an improved muffler for a small air-cooled two-stroke gasoline internal combustion engine as set forth in the Japanese Patent Application H8-84260 and the Japanese Patent Application H8-84324 (U.S. patent application Ser. No. 08/773,978, now U.S. Pat. No. 5,738,184, which take into account the aforementioned problems. Namely, this improved muffler is provided with an expansion chamber to which an exhaust gas ejected from the exhaust port of an engine is introduced. The expansion chamber is perpendicularly separated by means of a partition plate into a first expansion chamber and a second expansion chamber. This partition plate is provided with an oxidation catalyst, which is composed of a metallic foamed body having gas-permeability. Accordingly, an exhaust gas is initially introduced into the first expansion chamber and then passed via the oxidation catalyst to the second expansion chamber. In the case of the Japanese Patent Application H8-84324 in particular, an outside air intake means is mounted near the exhaust gas inlet portion of the first expansion chamber. This outer air intake means is designed to introduce outside air into the expansion chamber by taking advantage of the jet flow of the exhaust gas into the expansion chamber.

Although this modified muffler is designed to introduce the outside air by taking advantage of the jet flow of the exhaust gas, it is difficult to introduce a sufficient quantity of air to sufficiently reduce the CO component even with the force of the jet flow of the exhaust gas. Namely, if the CO component in the exhaust gas is to be minimized, the CO component is required to be reacted with the $O_2$ in the air so as to generate $CO_2$. However, if the quantity of air introduced into the muffler by taking advantage of the jet flow of the exhaust gas is not sufficient, the quantity of $O_2$ available for the reaction will also be insufficient, so that the reaction of CO to produce $CO_2$ is limited, thus making it difficult to sufficiently reduce the CO component.

On the other hand, in the case of four-stroke engines employed in a motor car or a motor bicycle, there has been proposed to employ an air pump which is actuated by means of power for feeding outside air to the muffler. However, since the air pump itself is relatively expensive and heavy, requiring a special driving device, it is not suited for use with a muffler for a small air-cooled two-stroke gasoline internal combustion engine which is suited for use in portable small working machines.

SUMMARY OF THE INVENTION

The present invention overcomes the aforementioned conventional problems. It is therefore an object of the present invention to provide an air-supplying device for a muffler of an internal combustion engine, which is light in weight, easy to actuate, simple in structure and capable of effectively supplying a sufficient quantity of air.

With a view to realizing the aforementioned objects, the muffler for a two-stroke internal combustion engine according to the present invention includes an expansion chamber into which an exhaust gas ejected from the exhaust port of an internal combustion engine is introduced, an air-supplying device which is adapted to supply outside air into the expansion chamber, and a purifying member disposed inside the expansion chamber. The air-supplying device is designed to be actuated by the pressure pulsation in the crank case of the internal combustion engine and is constituted by a diaphragm pump.

In a preferred embodiment of the invention, the diaphragm pump comprises a pressure-driving chamber, a back-pressure-actuating chamber which is partitioned by a diaphragm from the pressure-driving chamber, and a valve system comprising a suction valve and a discharge valve. The pressure-driving chamber communicates with the crank case, and the back-pressure-actuating chamber communicates not only with the external atmosphere through the suction valve but also with the expansion chamber of the muffler through the discharge valve.

According to another embodiment of the invention, the expansion chamber is provided with an air-inlet tube communicating with the air-supplying device, and is also provided in the vicinity of the exhaust gas inlet port with a Venturi tube which is disposed to allow an exhaust gas to pass therethrough, the throat portion of the Venturi tube communicating with the air-inlet tube.

In a muffler for a two-stroke internal combustion engine according to the present invention as described above, exhaust gas ejected from the exhaust port of the engine is introduced into the first expansion chamber at a high speed almost equivalent to sonic velocity and the exhaust gas thus introduced into the first expansion chamber is expanded and diffused in the first expansion chamber, thereby attenuating the exhaust noise. On the other hand, the diaphragm pump is actuated according to the pressure change in the crank case of the engine so as to suck the outside air through the air inlet tube and to eject such air into the expansion chamber of the muffler via an air discharge tube. The exhaust gas introduced into the expansion chamber is then mixed with the air ejected from the air inlet tube.

As explained above, since the outside air is forcibly fed into the expansion chamber of the muffler by the action of the diaphragm pump, the quantity of oxygen in the first expansion chamber is increased, thereby promoting the oxidation reaction of carbon monoxide. Hence, the CO component in the exhaust gas as finally discharged is substantially reduced.

In accordance with the invention, the diaphragm pump employed as the air supply device for feeding air into the muffler is driven by taking advantage of the pressure pulsation in the crank case of the internal combustion engine, thus avoiding the need for other special pumping means.

Since the diaphragm pump comprises a valve component functioning as a check valve, even if the exhaust gas happens to enter into the diaphragm pump through the air inlet tube, the exhaust gas is obstructed by the valve component, thereby preventing the exhaust gas from leaking out to the atmosphere.

DETAILED DESCRIPTION OF PREFERRED EMBODIMENTS OF THE INVENTION

Figure 1:
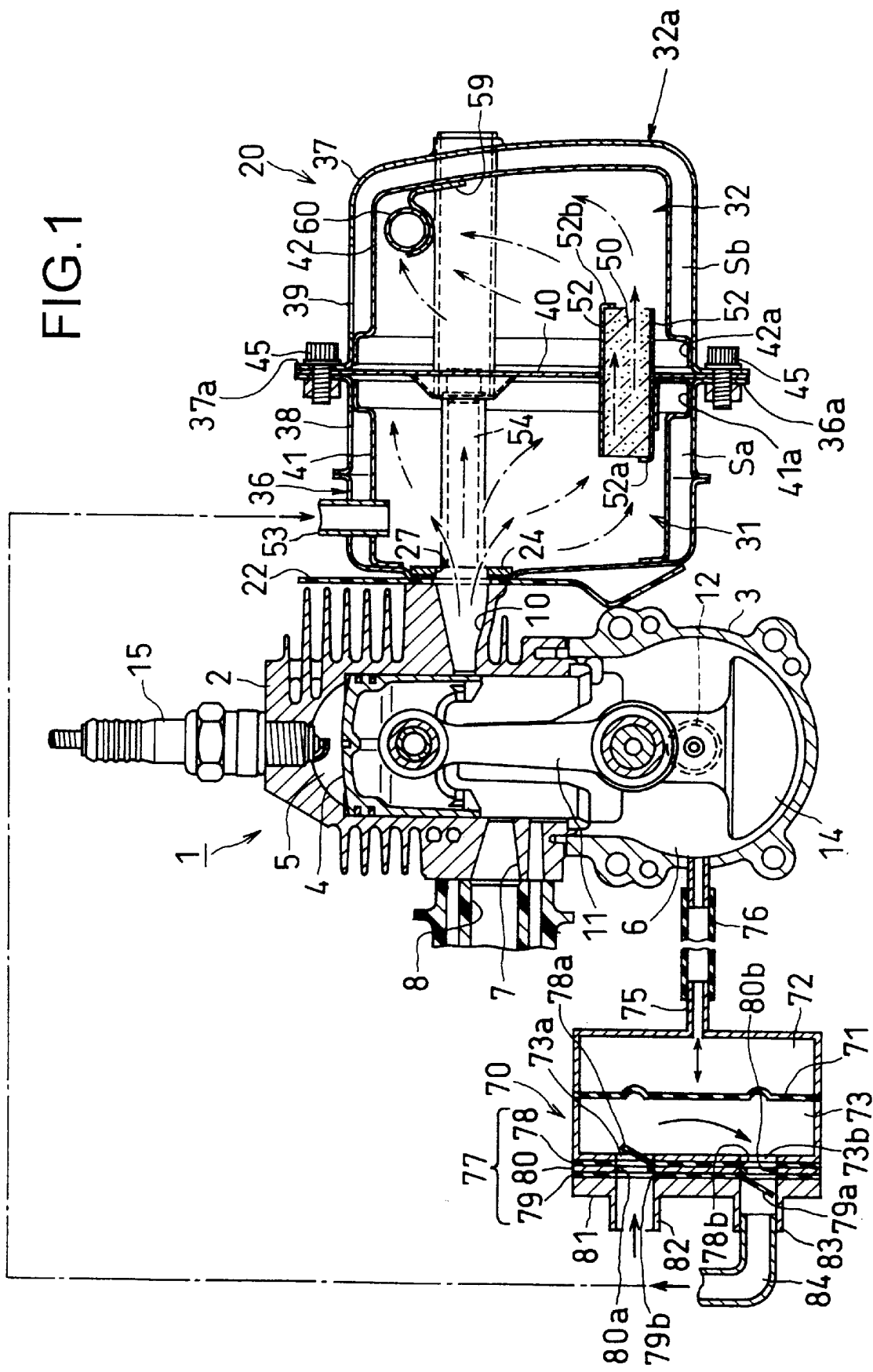
FIG. 1 is a longitudinal sectional view illustrating one embodiment of a muffler according to the present invention, together with a small air-cooled two-stroke gasoline engine to which the muffler is attached.

FIG. 1 shows one embodiment of an air supply device of the muffler according to the present invention, together with a small air-cooled two-stroke gasoline engine (hereinafter referred to as "an internal combustion engine" or simply "the engine") to which the muffler is attached. As shown in FIG. 1, the internal combustion engine 1 has attached thereto a muffler 20. A diaphragm pump 70, functioning as an air supply device, is interconnected between the internal combustion engine 1 and the muffler 20 (as indicated by the dashed line).

The internal combustion engine 1 is formed of a small air-cooled two-stroke gasoline engine of the Schneurle scavenging type, which is usually mounted as a power source in a portable working machine such as a bush cutter or a chain saw. The displacement of such an engine is typically about 23 cc. This engine 1 comprises a cylinder 2 having a semi-spherical combustion chamber 5 provided with an ignition plug 15, a crank case 3 disposed below and in communication with the cylinder 2, a piston 4 movably fitted in the cylinder 2, an intake port 7 communicating with an air-fuel mixture-feeding passage 8 and an exhaust port 10 communicating with the muffler 20 in a predetermined manner as explained hereinafter, disposed on both sides, as viewed in the plane of FIG. 1, and a pair of scavenging ports (not shown) which are disposed on the front and rear sides respectively (as viewed in the plane of FIG. 1) in a predetermined manner.

In the same manner as in the ordinary internal combustion engine, the reciprocating up-and-down motion of the piston 4 is converted via a connecting rod 11 to a rotational motion of a crank shaft 12 provided with a balance weight 14 disposed inside the crank case 6, the shaft output thereof being utilized as a motive power of the aforementioned portable working machine.

The muffler 20 according to this embodiment is attached via a heat-insulating plate 22 to the outside portion of the exhaust port 10 of the cylinder 2 of the engine 1. The muffler 20 includes a first expansion chamber 31 and a second expansion chamber 32 which are partitioned by means of a partition plate 40 arranged vertically (in the direction of height of the internal combustion engine 1). The partition plate 40 is preferably composed of stainless steel (SUS) having a heat conductivity about one third of that of ordinary carbon steel plate.

The first expansion chamber 31 comprises a double wall portion having a box-shaped or cylindrical inner wall panel 41 whose left and right sides (as viewed in FIG. 1) are open, an outer wall panel 36 whose right side (as viewed in FIG. 1) is open, and the partition plate 40, forming a shape of a rectangular parallelepiped as a whole. The outer wall panel 36 is provided, at a portion thereof which corresponds to the outer side portion of the exhaust port 10, with a reinforcing plate 24, and also with an exhaust gas inlet port 27 for introducing the exhaust gas ejected from the exhaust port 10 into the muffler 20. A diametrally enlarged portion 41a of the inner wall panel 41 located adjacent to the partition plate 40 is welded or otherwise hermetically sealed to the outer wall panel 36. The inner wall panel 41 is also hermetically sealed to the left side of the outer wall panel 36 (as viewed in FIG. 1). All of the inner wall panel 41 and the outer wall panel 36, except these hermetically sealed portions, are spaced apart from each other by a suitable distance, thus forming a first air space Sa therebetween.

On the other hand, the second expansion chamber 32 comprises a double wall portion 32a (which is comprised of a box-shaped or cylindrical inner wall panel 42 having an opening at its left side (as viewed in FIG. 1) and an outer wall panel 37) and the partition plate 40, forming a shape of a rectangular parallelepiped as a whole. A diametrally enlarged portion 42a of the inner wall panel 42 which is located near to the internal combustion engine 1 is hermetically sealed to the corresponding portion of the outer wall panel 37 by means of welding. All of the inner wall panel 42 and the outer wall panel 37, except this hermetically sealed portion, are spaced apart from each other by a suitable distance, thus forming a second air space Sb therebetween.

The outer wall panels 36 and 37, each forming an outer wall of the first expansion chamber 31, and the second expansion chamber 32, are provided with flange-like terminal portions 36a and 37a, which are hermetically sealed to each other by means of suitable number of bolts and nuts 45, 45 with the partition plate 40 being interposed therebetween.

A required number of oval-shaped or racetrack-shaped openings 38 and 39 arrayed side by side are formed, adjacent to the partition plate 40, in the upper surface portions of the outer wall panels 36 and 37, thereby allowing the air spaces Sa and Sb to communicate with the atmosphere.

A rectangular parallelepiped oxidation catalyst 50 formed of an air-permeable foamed body is arranged as an exhaust emission purifier at the lower portion of the partition plate 40 in such a manner that the columnar oxidation catalyst 50 penetrates in thickness-wise the partition plate 40, i.e. the columnar oxidation catalyst 50 protrudes into the first expansion chamber 31 as well as into the second expansion chamber 32. This oxidation catalyst 50 is removably supported in a shell 52 in such a manner that after the oxidation catalyst 50 is introduced into the shell 52, a pair of claw-shaped stoppers 52a and 52b, which are formed at a center portion of the lower left edge and to a center portion of the upper right edge of the shell 52 respectively, are bent over to hold the oxidation catalyst 50, thus making it possible to exchange it if desired.

The muffler 20 is attached to the cylinder 2 of the internal combustion engine 1 by means of a pair of bolts 54 (shown in dashed lines in FIG. 1) disposed on both sides thereof so that the exhaust port 10 of the internal combustion engine 1 communicates with the exhaust gas inlet port 27 at a level higher than where the oxidation catalyst 50 (as viewed in FIG. 1) is located on the partition plate 40.

A tail pipe 60 constituting an exhaust gas discharge port for discharging exhaust gas to the outer air is disposed at the upper right corner of the second expansion chamber 32 and is supported by a supporting bracket 59. The optimum dimensions of length and inner diameter of the tail pipe 60 may be determined taking the improvement of output and the attenuation of noise into consideration.

The volume of the muffler 20 according to this embodiment is relatively large as compared with that employed in the conventional internal combustion engine of almost the same displacement, e.g. 1.5 to 2 times (about 18 times as large as the of displacement of the engine) as large as the volume of the conventional muffler, i.e. Prior Art No. 1 and 2.

Further, at the upper left portion of the muffler 20 is fixed an air inlet tube 53 which is protruded from outside into the first expansion chamber 31 of the muffler 20.

The diaphragm pump 70 to be used as an air supply device is provided with a pressure-driving chamber 72 and a backpressure-actuating chamber 73 which are partitioned by a diaphragm 71, and also with a valve system 77 and a closing plate 81. The pressure-driving chamber 72 is provided with a connector tube 75 that communicates with the crank case 6 of the internal combustion engine 1 via an additional connector tube 76.

On the other hand, the back-pressure-actuating chamber 73 is provided with a pair of openings 73a and 73b which function to introduce and discharge air, respectively. The valve system 77 is formed of a laminate structure comprising a couple of elastic membranes 78 and 79 and a thin valve sheet 80 interposed therebetween. The valve system 77 is interposed between the closing plate 81 and the back-pressure-actuating chamber 73 and is integrally secured to both.

The closing plate 81 is provided with an air inlet tube 82 and an air discharge tube 83, which are disposed coaxial with the openings 73a and 73b, respectively. The thin valve sheet 80 is also provided with a small openings 80a and 80b, which are disposed coaxial with and smaller in diameter than the openings 73a and 73b, respectively.

The elastic membrane 78 is provided, at its side portion facing the air inlet tube 82, with an inlet valve component 78a adapted to swing toward the back-pressure-actuating chamber 73. The other elastic membrane 79 is provided, at its side portion facing the air discharge tube 83, with an exhaust valve component 79a adapted to swing in the direction opposite to the back-pressure-actuating chamber 73. The pair of elastic membranes 78 and 79 are provided, at the other side portions where the valve components 78a and 79a are not formed, with openings 78b and 79b, respectively, in conformity with the openings 73a and 73b.

The air discharge tube 83 is connected via a connector tube 84 with the air inlet tube 53 of the muffler 20.

Accordingly, when the piston 4 of the internal combustion engine 1 is reciprocated up and down to fluctuate the pressure inside the crank case 6, the resultant pressure fluctuation (pressure pulsation) is transmitted into the interior of the pressure-driving chamber 72 of the diaphragm pump 70, thereby producing a pressure fluctuation or pulsation inside the pressure-driving chamber 72. In conformity with the pressure pulsation generated inside the pressure-driving chamber 72, the diaphragm 71 is also caused to vibrate, thereby fluctuating or pulsating the pressure inside the back-pressure-driving chamber 73.

When the back-pressure-driving chamber 73 is turned to a negative pressure, the inlet valve component 78a of the elastic membrane 78 is caused to bend, allowing the outer air to enter from the air inlet tube 82 into the back-pressure-driving chamber 73. On the other hand, when the pressure inside the back-pressure-driving chamber 73 becomes higher than the outer atmosphere, the inlet valve component 78a is kept seated on the thin valve sheet 80 to close the inlet opening 80a, thereby preventing outside air from entering the back-pressure-driving chamber 73. The exhaust valve component 79a of the other elastic membrane 79 is kept seated on the thin valve sheet 80 to close the discharge opening 80b when the back-pressure-driving chamber 73 is turned to a negative pressure, thereby preventing the outside air from being discharged into the air discharge tube 83. However, when the pressure inside the back-pressure-driving chamber 73 becomes higher than the pressure inside the air discharge tube 83, the exhaust valve component 79a of the elastic membrane 79 is caused to bend and allow the air to be discharged from the back-pressure-driving chamber 73 into the air discharge tube 83.

In the internal combustion engine 1 which is provided with the muffler 20 having the aforementioned diaphragm pump 70 according to this embodiment, the exhaust gas ejected from the exhaust port 10 of the engine 1 is forced to flow (as indicated by a dot and dash line in FIG. 1) into the first expansion chamber 31 at a high speed almost equivalent to the sonic velocity, so as to be expanded and diffused therein. This attenuates the exhaust noise.

On the other hand, the diaphragm pump 70 is actuated according to the pressure fluctuation (pulsation) in the crank case 6 of the internal combustion engine 1, thereby sucking the outer air from the air inlet tube 82 and then discharging the air into the air discharge tube 83. The air introduced into the air discharge tube 83 passes via the connector tube 84 to the air inlet tube 53, from which the air is ejected into the first expansion chamber 31 of the muffler 20.

Thus, the exhaust gas introduced into the first expansion chamber 31 is mixed with the air ejected from the air inlet tube 53. The exhaust gas is then forced to pass through the oxidation catalyst 50 penetrating through the partition plate 40 due to a pressure difference between the first expansion chamber 31 and the second expansion chamber 32 which are separated from each other by means of the partition plate 40. After passing through the small pores formed in the oxidation catalyst 50, the exhaust gas is introduced into the second expansion chamber 32. In this case, owing to the effects of the oxidation catalyst 50, the exhaust gas can be effectively reacted with oxygen (oxidative combustion) existing in the first expansion chamber 31, thus extremely reducing the THC contained in the exhaust gas. Thereafter, the exhaust gas is discharged from the second expansion chamber 32 through the tail pipe 60 disposed at the upper portion of the second expansion chamber 32.

Since the outside air is forcibly fed into the first chamber 31 of the muffler 20 by the action of the diaphragm pump 70, the quantity of oxygen ($O_2$) inside the first chamber 31 can be increased, thereby promoting the oxidation of carbon monoxide (CO), and hence the content of CO can be extremely reduced.

Since the diaphragm pump 70 is employed as an air supply device for the muffler 20 in this embodiment, the diaphragm pump 70 can be actuated by taking advantage of the pressure pulsation in the crank case 6 of the internal combustion engine 1, thus avoiding the need for other special pumping means.

Since the diaphragm pump 70 comprises the valve components 78a and 79a functioning as check valves, even if the exhaust gas in the muffler 20 happens to enter into the diaphragm pump 70 through the air inlet tube 53, the exhaust gas is obstructed by the valve components 78a and 79a, and thereby prevented from leaking out into the outer atmosphere.

Furthermore, since the diaphragm pump 70 is light in weight and can be made small in size, it can be easily mounted on any portion of the engine, and hence is suited for mounting on an engine of a portable small working machine.

While in the foregoing embodiment of the invention has been explained in details for the purpose of illustration, it will be understood that the construction of the device can be varied without departing from the spirit and scope of the invention.

Figure 2:
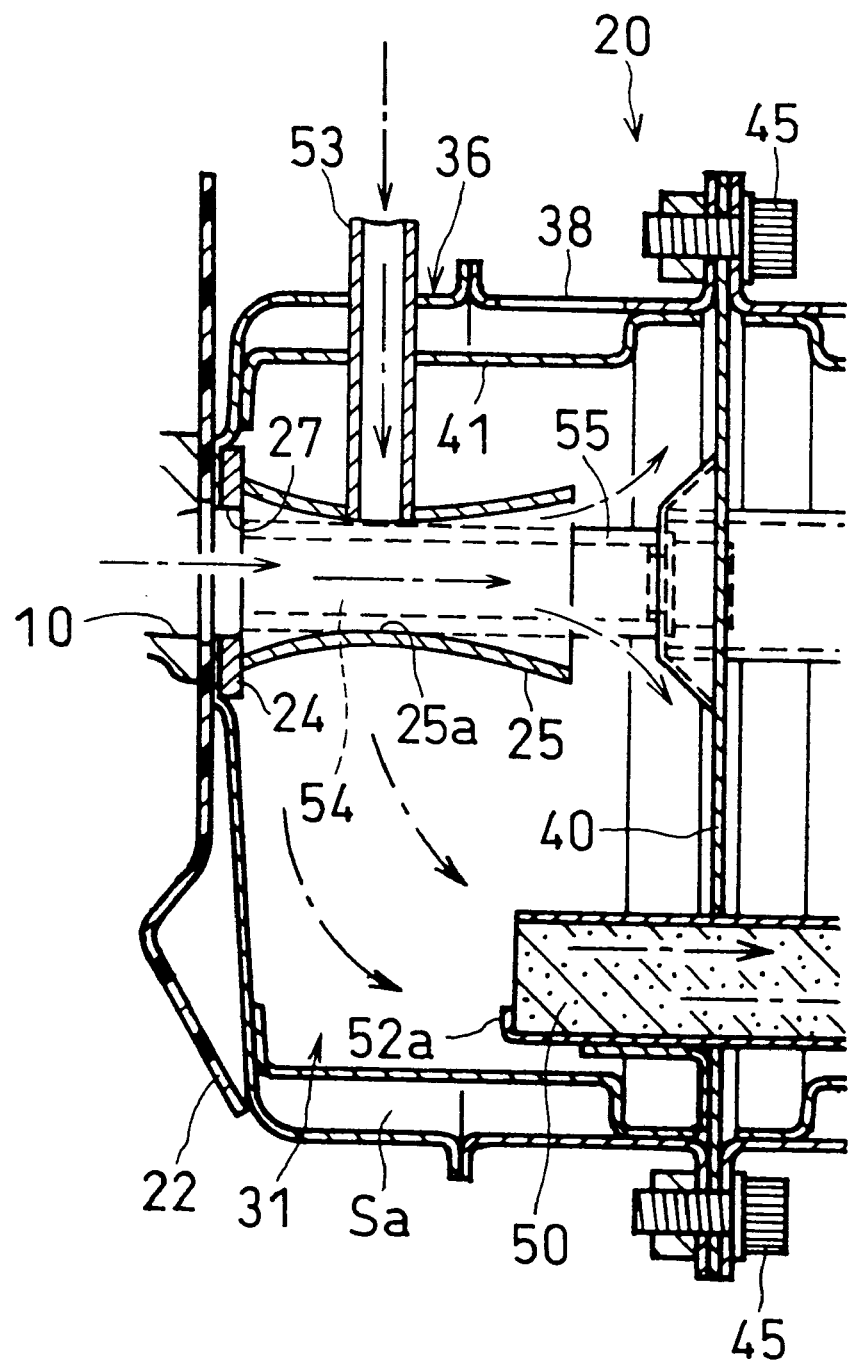
FIG. 2 is a longitudinal sectional view showing a muffler provided with a Venturi tube, which represents another embodiment of the air supply device of the muffler according to the present invention.

For example, a Venturi tube 25 maybe additionally employed as an outer air intake means as shown in FIG. 2. As shown in FIG. 2, the Venturi tube 25 is arranged to extend along the jet flow direction of the exhaust gas so as to allow the exhaust gas to pass therethrough from the exhaust port 10 of the internal combustion engine 1. A throat portion 25a of the Venturi tube 25 is connected with the air inlet tube 53. The venturi tube 25 is fixed to the reinforcing plate 24 by means of welding for example.

In this case, the exhaust gas discharged from the exhaust port 10 generates the jet flow as it passes through the Venturi tube 25, thereby producing a negative pressure at the terminal portion of the air inlet tube 53 communicating with the throat portion 25a. As a result, the air that has been transferred from the diaphragm pump 70 can be further suctioned by this negative pressure. Due to this suctioning action, the outer air can be more effectively forced to enter into the first expansion chamber 31 of the muffler 20, thus making it possible to further minimize the diaphragm pump 70.

If required, a filter may be interposed in the air inlet tube 82 for the purpose of preventing any foreign matter from entering into the diaphragm pump 70. Also, a flow control means may be interposed at the passageway of air communicating with the air inlet tube 53.

As explained above, the air-supplying device of a muffler for a two-stroke internal combustion engine according to this invention is designed such that the outside air can be forcibly fed into the expansion chamber of the muffler and the purifying property of the muffler for removing harmful matters, in particular carbon monoxide (CO), can be remarkably improved.

Since the aforementioned air-supplying device is designed to be actuated by taking advantage of the pressure pulsation in the crank case of the internal combustion engine, special driving means for actuating the air-supplying device can be dispensed with.

Furthermore, since a diaphragm pump is employed as an air-supplying device, the device can be made light in weight and small in size, so that there would be little restriction regarding the positioning of the device. Hence, the device is suited for mounting on an internal combustion engine of a portable small working machine.

We claim:

1. A muffler for a 2-stroke internal combustion engine having a crank case, said muffler comprising:

an expansion chamber for receipt of exhaust gas ejected from the internal combustion engine;

a pump which is fluidly connected to said expansion chamber for supplying outside air to said expansion chamber, said pump having a port in fluid communication with the crank case for exposure to pressure pulsation therein, said pump being actuated by the pressure pulsation in the crank case of the internal combustion engine so as to supply the outside air to said expansion chamber; and a purifying member disposed inside said expansion chamber.

2. The muffler according to claim 1, wherein said pump comprises a diaphragm pump.

3. A muffler for a 2-stroke internal combustion engine having a crank case, said muffler comprising:

an expansion chamber for receipt of exhaust gas ejected from the internal combustion engine;

a diaphragm pump which is fluidly connected to said expansion chamber for supplying outside air to said expansion chamber, said diaphragm pump having a port in fluid communication with the crank case for exposure to pressure pulsation therein, said pump being actuated by the pressure pulsation in the crank case of the internal combustion engine so as to supply the outside air to said expansion chamber; and a purifying member disposed inside said expansion chamber;

wherein said diaphragm pump comprises:

a pressure-driving chamber communicating with the crank case;

a back-pressure-actuating chamber;

a diaphragm partitioning said pressure-driving chamber from said back-pressure-actuating chamber;

a valve system comprising a suction valve and a discharge valve; and said back-pressure-actuating chamber communicates with the external atmosphere through said suction valve and with the expansion chamber through said discharge valve.

4. The muffler according to claim 1, 2 or 3, further comprising an air-inlet tube connected to said expansion chamber for communicating with said pump.

5. The muffler according to claim 4, further comprising a Venturi tube provided within said expansion chamber and positioned to allow the exhaust gas to pass therethrough, a throat portion of said Venturi tube communicating with said air-inlet tube.

* * * * *